(12) United States Patent
Matesanz Gil et al.

(10) Patent No.: US 8,157,532 B2
(45) Date of Patent: Apr. 17, 2012

(54) WIND TURBINE BLADE WITH ANTI-NOISE DEVICES

(75) Inventors: Alvaro Matesanz Gil, Madrid (ES); Luis Miguel Garcillan Rueda, Madrid (ES)

(73) Assignee: Gamesa Innovation & Technology, S.L., Sarriguren (ES)

( * ) Notice: Subject to any disclaimer, the term of this patent is extended or adjusted under 35 U.S.C. 154(b) by 999 days.

(21) Appl. No.: 12/154,570

(22) Filed: May 23, 2008

(65) Prior Publication Data

US 2008/0298967 A1    Dec. 4, 2008

(30) Foreign Application Priority Data

May 31, 2007    (ES) .................................. 200701494

(51) Int. Cl.
*F03D 1/06* (2006.01)
(52) U.S. Cl. ...................... 416/235; 416/236 R; 415/914
(58) Field of Classification Search .................. 415/914; 416/235, 236 R
See application file for complete search history.

(56) References Cited

U.S. PATENT DOCUMENTS

| | | | | |
|---|---|---|---|---|
| 3,578,264 A | * | 5/1971 | Kuethe | 244/200.1 |
| 5,058,837 A | * | 10/1991 | Wheeler | 244/200.1 |
| 7,604,461 B2 | * | 10/2009 | Bonnet | 416/235 |
| 2007/0284848 A1 | * | 12/2007 | Brownlie | 280/288.1 |

FOREIGN PATENT DOCUMENTS

WO    WO2006/122547    * 11/2006
* cited by examiner

*Primary Examiner* — Edward Look
*Assistant Examiner* — Liam McDowell
(74) *Attorney, Agent, or Firm* — Ladas & Parry LLP

(57) ABSTRACT

A wind turbine comprising at least a blade (11) having an aerodynamic profile with a leading edge (13), a trailing edge (15) and suction and pressure sides between the leading edge (13) and the trailing edge (15) that includes an anti-noise device (31) placed on the suction side formed by elements (33) that modify the frequency spectra of the boundary layer noise. Preferably the anti-noise device (31) is placed on the suction side between two sections corresponding to chord positions in the range of 40%-95% of the chord length, measured from the leading edge (13).

14 Claims, 3 Drawing Sheets

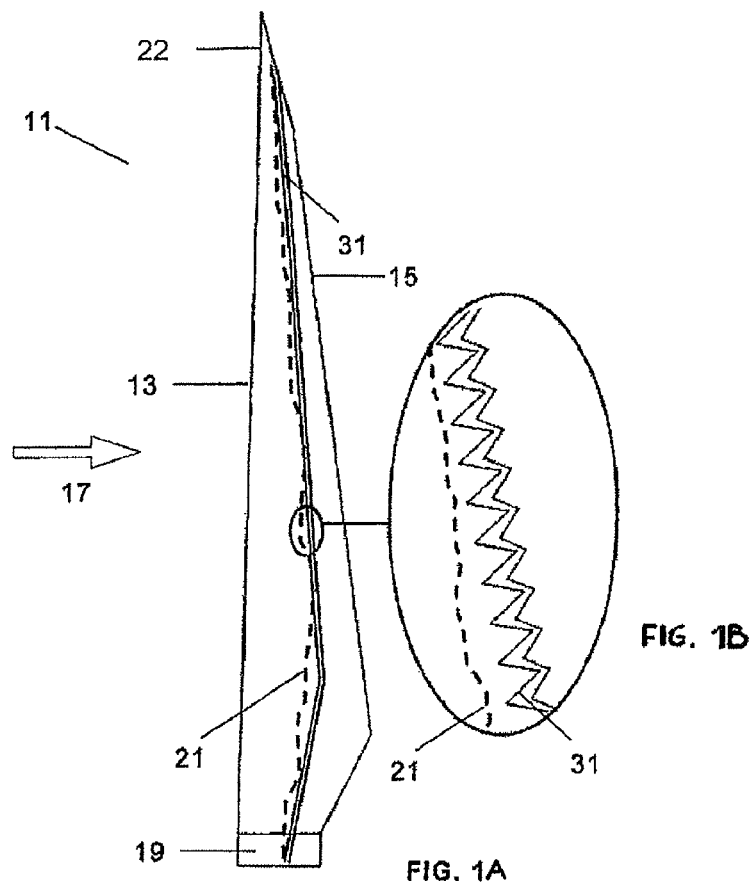
FIG. 1A
FIG. 1B
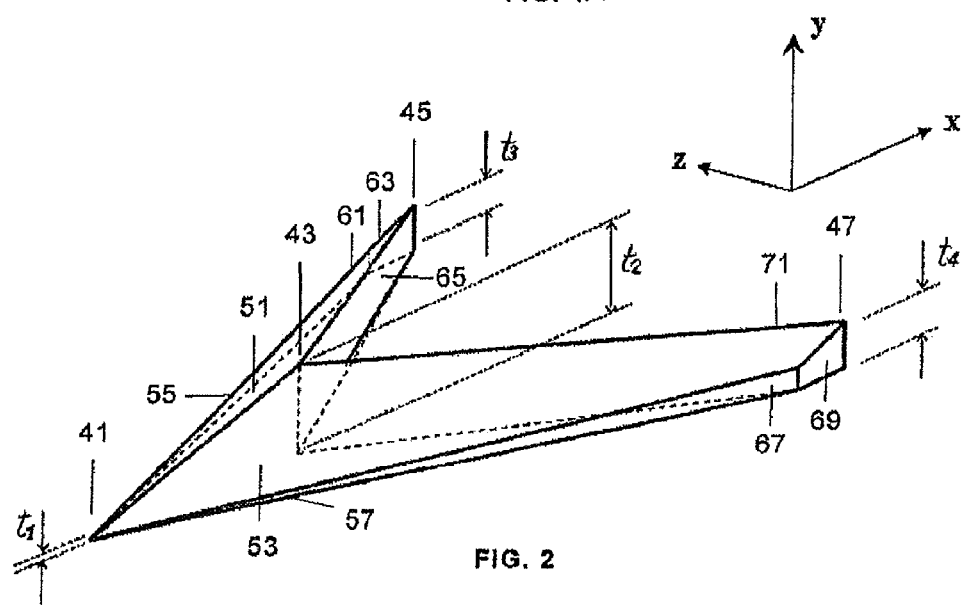
FIG. 2

WIND TURBINE BLADE WITH ANTI-NOISE DEVICES

FIELD OF THE INVENTION

The invention relates to wind turbine blades with anti-noise devices and in particular with devices intended for reducing the aerodynamic audible noise produced in dB(A).

BACKGROUND

An important constrain in the power production in wind turbines is that imposed by the noise generated during operation. In particular, wind turbine blades produce aerodynamic audible noise due to the interaction between the boundary layer and the trailing edge.

Turbulent boundary layers on wind turbine blades produce noise after the onset of the transition and when interacting with the trailing edge. The anisotropy, history and length scale of the turbulence within the boundary layer affect the noise generated by an airfoil.

There are known several proposals for reducing the aerodynamic noise produced by wind turbine blades.

One of them is the use of serrated trailing edges. In this respect, EP0652367 discloses rotor blades having its rear edge irregularly formed, in particular in a saw-tooth form. EP1314885 discloses rotor blades with serrated trailing edges each having a plurality of span-wise, periodic indentations, in the form a saw teeth having approximately 60 degrees included angles between adjacent vertices. EP1338793 discloses rotor blades in which a dentation is formed in the trailing edge part of the blade which is shaped in a serration of triangular tooth, of trapezoid tooth, or of sawtooth.

Another proposal, disclosed in WO2006/122547, is the use of turbulence generating means as noise reduction means. Said means are placed on the leeward surface side of the wind turbine blade and at the outer section of the wind turbine blade in direction of the blade tip.

The prior art also teaches the use of wind turbine operational control methods for reducing the aerodynamic noise and, in particular, controlling the rotor speed. In this respect, the publication "Wind Turbine Noise", Wagner et al., Springer-Verlag Berlin Heidelberg 1996 summarizes the problems raised by the noise produced by wind turbines and some proposals for its reduction.

The present invention provides a different solution for reducing the aerodynamic noise produced by the wind turbine blades.

SUMMARY OF THE INVENTION

An object of the present invention is to provide a wind turbine blade with means that allow altering the characteristics of the boundary layer and therefore modify the emitted noise.

Another object of the present invention is to provide a wind turbine blade with audible noise reduction means. Although the acoustic energy in the noise emission may remain unaltered, the audible noise production will be reduced.

These and other objects of the present invention are met by providing a wind turbine comprising at least a blade having an aerodynamic profile with a leading edge, a trailing edge and suction and pressure sides between the leading edge and the trailing edge and including an anti-noise device placed on the suction side formed by elements that modify the frequency spectra of the boundary layer noise.

As it will be explained in detail below, said elements are not intended to produce turbulence as a mechanism for noise reduction like in WO 2006/122547 but coherent fluidic structures. The introduction of turbulence implies the introduction of random motion in the boundary layer, while the introduction of coherent structures is associated to the introduction of ordered motion in the boundary layer.

Other features and advantages of the present invention will be understood from the following detailed description in relation with the enclosed drawings.

BRIEF DESCRIPTION OF DRAWINGS

FIG. 1 is a schematic side view of a wind turbine blade with an anti-noise device according to the present invention.

FIG. 2 is a perspective view of a single element of an anti-noise device according to the present invention.

DETAILED DESCRIPTION OF PREFERRED EMBODIMENTS

When the flow goes over a blade, a boundary layer is formed. This boundary layer is the region in the flow field where the velocity adapts from the velocity in the flow away from the blade and the non-slip condition that is naturally imposed on the surface of it. The nature of the boundary layer can be laminar or turbulent. A laminar boundary layer could be seen as a boundary layer where the flow moves smoothly, like in layers parallel to the surface. Laminar boundary layers naturally develop into turbulent boundary layers, where there is a high component of random motion. The change from laminar to turbulent occurs in a region called "transition region", where different fluidic structures develop changing the nature of the boundary layer. The first turbulent structure to appear is the "turbulent spot". Turbulent spots travel downstream, merge and develop into Λ structures (also called hairpin structures). The latter structures promote mixing in the boundary layer, and due to the motion patterns introduced in the flow, they are self-maintained. Short after the appearance of the Λ structures the flow becomes completely turbulent, and no instantaneous order can be found. In turbulent boundary layers "real" viscous effects (those due to the viscosity) are only present in the viscous sub-layer, which is a very small region close to the wall. In the rest of the turbulent boundary layer the viscous effects are only apparent, as they are due to the random motion and not to the viscosity and shear stress energy dissipation.

The power levels of noise emitted and its distribution in frequencies highly depends on the length scale of the turbulence and the power spectra of the pressure fluctuations introduced on the surface of the blade by the turbulent motion. The scale of the turbulent structures within the boundary layer is of the same order of the boundary layer thickness, and its characteristic length scales and power spectra distribution are highly dependent on the history of the boundary layer upstream of the location considered, which, for aeroacoustic purposes, is usually the trailing edge.

It is the idea of this invention to alter both, the scale of the turbulence and its power distribution in the frequency domain by the use of elements introducing coherent fluidic structures, placed behind the location of the transition line, where the change from laminar to turbulent boundary layer occurs.

FIG. 1 shows a wind turbine blade 11 having a leading edge 13 and a trailing edge 15 that includes an anti-noise device 31 according to this invention placed on the right side—from the point of view of the wind direction 17—of the transition line 21 where the change from a laminar boundary layer to a turbulent laminar layer occurs.

Figure 7:
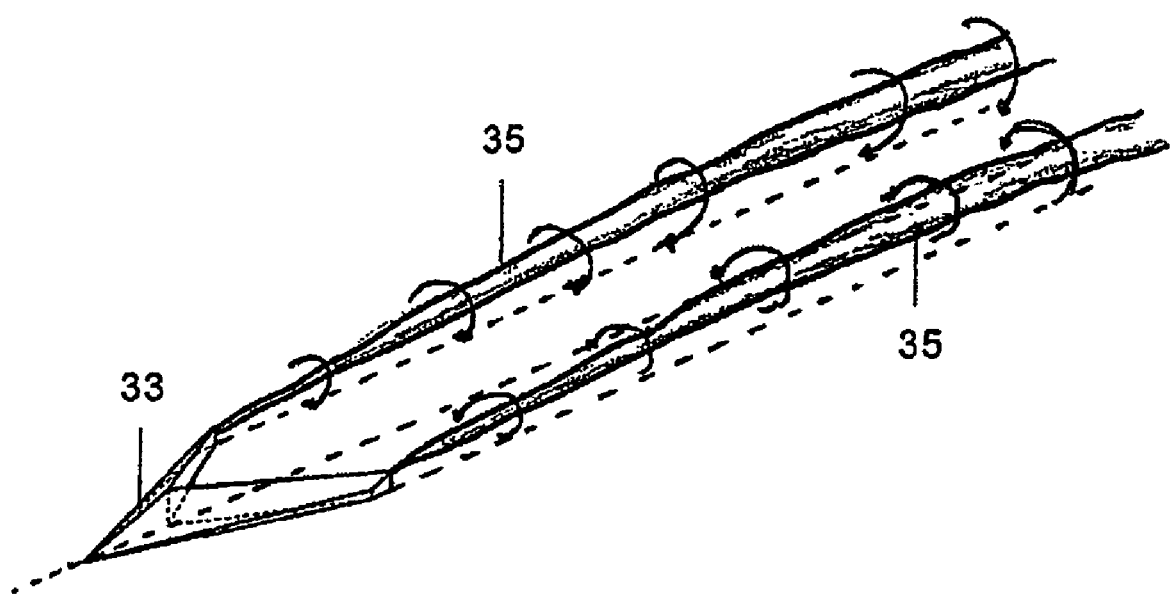
FIG. 7 shows schematically the coherent vortical structures generated by a single element of an anti-noise device according to the present invention.

When the flow near the blade goes over the anti-noise device, coherent vortical structures 35 (see FIG. 7), aligned with the free-stream are produced, dramatically altering the boundary layer and changing its fluidic characteristics. Streamwise aligned coherent vortices have shown to have a great impact on the velocity distribution on the boundary layer and on its turbulent characteristics, i.e. turbulence levels, turbulent kinetic energy production, etc.

In modern wind turbine blades it can be considered that the transition line 21 is located, for moderate angles of attack, between two sections corresponding to chord positions in the range of 40%-95% of the chord length, measured from the leading edge 13.

FIG. 1 shows the anti-noise device 31 extending from the root 19 to the tip 22. It is thought that the anti-noise device 31 shall be placed along a section of the blade 11 extending between 5% to the 100% of its length measured from its root 19.

In another embodiment the anti-noise device 31 is placed along a section of the blade 11 extending between 66% to the 100% of its length measured from its root 19.

FIG. 2 shows an embodiment of a single element 33 that can be used in the anti-noise device 31 in its position with respect to the flow direction indicated by the x-axis and the blade span indicated by the z-axis.

Figure 3:
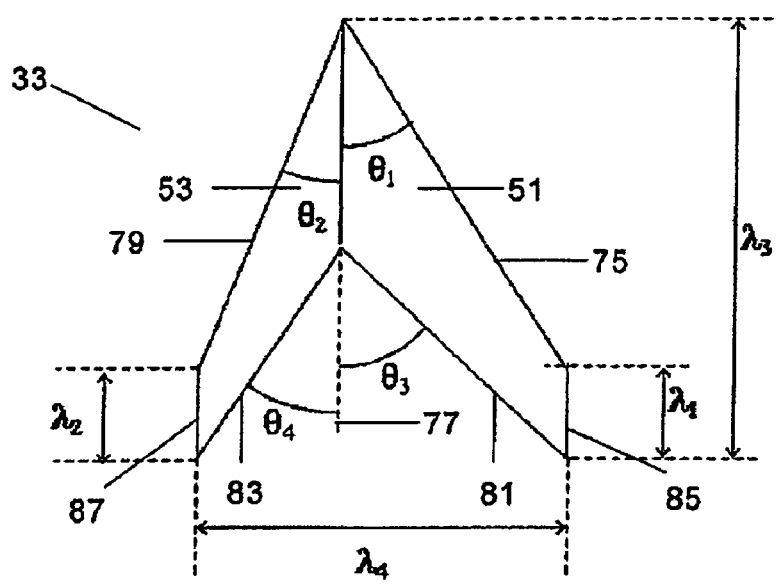
FIG. 3 is a plan view of the single element shown in FIG. 2.

Following FIGS. 2 and 3 it can be seen that the single element 33 is a body of an arrow shape which is positioned on the suction side of the blade 11 with the arrow tip 41 oriented towards the leading edge 13.

In another embodiment the single element 33 is positioned on the suction side of the blade 11 with the arrow tip 41 oriented towards the trailing edge 15.

The element 33 is defined by left and right upper and lower trapezoidal faces 51, 53, 55, 57 with common central sides from the arrow tip 41 to the arrow center 43 and lateral faces 61, 63, 65, 67, 69, 71 extending between said upper and lower faces 51, 53, 55, 57.

In a preferred embodiment the heights t1, t2, t3 and t4 of, respectively, the arrow tip 41, the arrow center 43 and the arrow left and right ends 45, 47 are comprised between 0-10 mm.

In another preferred embodiment the height t1 of the arrow tip 41 is less than the height t2 of the arrow center 43 and the heights t3, t4 of the arrow left and right ends 45, 47 are less than the height t2 of the arrow center 43 and greater than the height t1 of the arrow tip 41.

In a preferred embodiment the angle $\theta_1$ between the outer side 75 of the left upper face 51 and the arrow axis 77 is comprised between 5-60 deg, the angle $\theta_2$ between the outer side 79 of the right upper face 53 and the arrow axis 77 is comprised between 5-60 deg, the angle $\theta_3$ between the inner side 81 of the left upper face 51 and the arrow axis 77 is comprised between 30-90 deg and the angle $\theta_4$ between the inner side 83 of the right upper face 53 and the arrow axis 77 is comprised between 30-90 deg.

In a preferred embodiment the length $\lambda_1$ of the side 85 connecting the inner and outer sides 81, 75 of the left upper face 51 is comprised between 0-20 cm, the length $\lambda_2$ of the side 87 connecting the inner and outer sides 83, 79 of the right upper face 53 is comprised between 0-20 cm, the length $\lambda_3$ of a side projection of element 33 is comprised between 0-20 cm and the length $\lambda_4$ of a frontal projection of element 33 is comprised between 0-20 cm.

Figure 4:
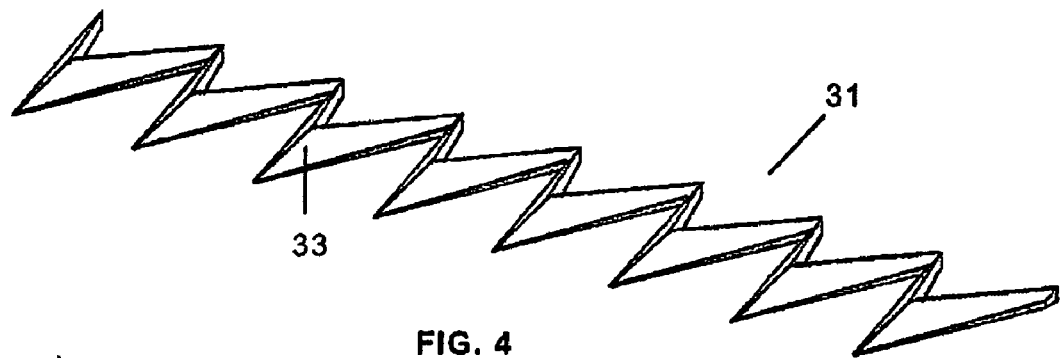
FIGS. 4, 5 and 6 are perspective views of three different embodiments of an anti-noise device according to the present invention.

FIG. 4 shows an anti-noise device 31 formed by a plurality of elements 33 placed on the blade individually, without leaving spaces between them.

Figure 5:
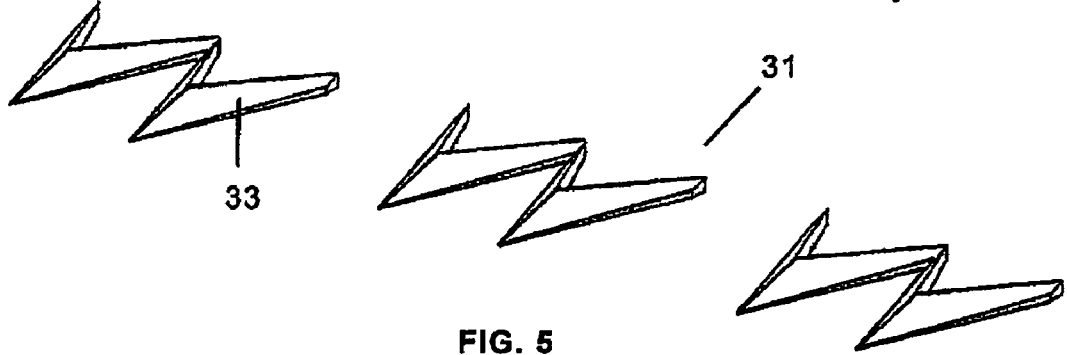

FIG. 5 shows an anti-noise device 31 formed by a plurality of elements 33 placed on the blade in groups, leaving spaces between the groups.

Figure 6:
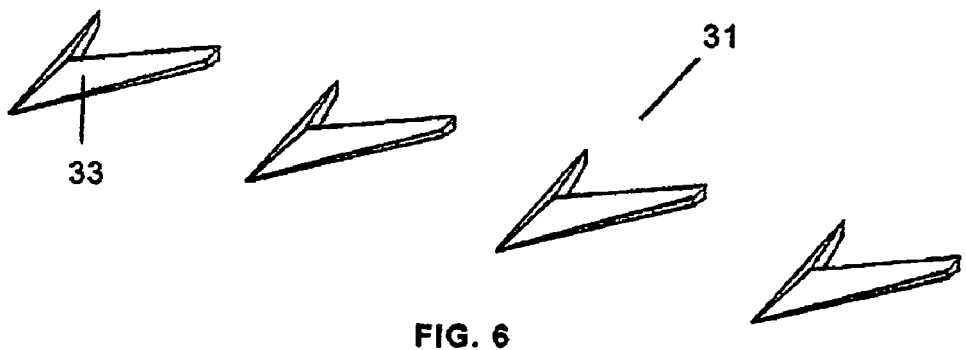

FIG. 6 shows an anti-noise device 31 formed by a plurality of elements 33 placed on the blade side by side leaving spaces between them.

Varying the geometrical dimensions already defined and the spacing between elements 33, different vortical strengths and core sizes can be obtained for the coherent vortical structures. Geometrical dimensions of the elements 33 have an impact on the fluidic characteristics of the generated filaments, and therefore can be tuned to be used over a wide range of wind turbine operating characteristics for noise reduction purposes. In all the cases the change in the velocity and vorticity distributions within the boundary layer is expected to shift the noise power spectra distribution (in dB(A)).

Although the present invention has been fully described in connection with preferred embodiments, it is evident that modifications may be introduced within the scope thereof, not considering this as limited by these embodiments, but by the contents of the following claims.

The invention claimed is:

1. A wind turbine comprising at least a blade (11) having an aerodynamic profile with a leading edge (13), a trailing edge (15) and a suction side and a pressure side between the leading edge (13) and the trailing edge (15), wherein the blade (11) includes an anti-noise device (31) placed on the suction side formed by a plurality of elements (33) which are bodies of an arrow shape, said bodies being defined by left and right upper and lower trapezoidal faces (51, 53, 55, 57) with common central sides from an arrow tip (41) to an arrow center (43) and lateral faces (61, 63, 65, 67, 69, 71) extending between said upper and lower trapezoidal faces (51, 53, 55, 57), that modify a frequency spectra of boundary layer noise.

2. The wind turbine according to claim 1, wherein said anti-noise device (31) is placed on the suction side between two sections corresponding to chord positions in a range of 40%-95% of a chord length, measured from the leading edge (13).

3. The wind turbine according to claim 2, wherein said anti-noise device (31) is placed along a section of the blade (11) extending between 5% to 100% of its length measured from its root (19).

4. The wind turbine according to claim 3, wherein said anti-noise device (31) is placed along a section of the blade (11) extending between 66% to 100% of its length measured from its root (19).

5. The wind turbine according to claim 1, wherein the plurality of elements (33) of the anti-noise device (31) are placed on the blade (11) individually, leaving spaces between them.

6. The wind turbine according to claim 1, wherein the elements (33) of the anti-noise device (31) are placed on the blade (11) in groups, leaving spaces between the groups.

7. The wind turbine according to claim 1, wherein the plurality of elements (33) of the anti-noise device (31) are placed on the blade (11) side by side without leaving spaces between the plurality of elements (33).

8. The wind turbine blade according to claim 1, wherein said elements (33) are placed on the blade (11) with the arrow tip (41) oriented towards the leading edge (13).

9. The wind turbine blade according to claim 1, wherein said elements (33) are placed on the blade (11) with the arrow tip (41) oriented towards the trailing edge (15).

10. The wind turbine blade according to claim 1, wherein heights (t1, t2, t3 and t4) of, respectively, the arrow tip (41), the arrow center (43), and arrow left and right ends (45, 47) are comprised between 0-10 mm.

11. The wind turbine blade according to claim 10, wherein the height (t1) of the arrow tip (41) is less than the height (t2) of the arrow center (43) and the heights (t3, t4) of the arrow left and right ends (45, 47) are less than the height (t2) of the arrow center (43) and greater than the height (t1) of the arrow tip (41).

12. The wind turbine blade according to claim 1, wherein a first angle ($\theta_1$) between an outer side (75) of the left upper face (51) and an arrow axis (77) is comprised between 5-60 degrees and a second angle ($\theta_2$), between the outer side (79) of the right upper trapezoidal face (53) and the arrow axis (77) is comprised between 5-60 degrees.

13. The wind turbine blade according to claim 1, wherein a third angle ($\theta_3$) between an inner side (81) of the left upper trapezoidal face (51) and an arrow axis (77) is comprised between 30-90 degrees and a fourth angle ($\theta_4$) between an inner side (83) of the right upper trapezoidal face (53) and the arrow axis (77) is comprised between 30-90 degrees.

14. The wind turbine blade according to claim 1, wherein a first length ($\lambda_1$) of a side (85) connecting inner and outer sides (81, 75) of the left upper face (51) is comprised between 0-20 cm, a second length ($\lambda_2$) of the side (87) connecting inner and outer sides (83, 79) of the right upper trapezoidal face (53) is comprised between 0-20 cm and a third length ($\lambda_3$) of a side projection of said elements (33) is comprised between 0-20 cm and a fourth length ($\lambda_4$) of a frontal projection of said elements (33) is comprised between 0-20 cm.

* * * * *